United States Patent
Mack et al.

(10) Patent No.: US 7,014,766 B2
(45) Date of Patent: Mar. 21, 2006

(54) SELF-VENTING FILTER ELEMENT FOR A FUEL FILTER ARRANGEMENT

(75) Inventors: Klaus Mack, Hardthausen (DE); Kai Knickmann, Remseck (DE)

(73) Assignee: Mann & Hummel GmbH, Ludwigsburg (DE)

( * ) Notice: Subject to any disclaimer, the term of this patent is extended or adjusted under 35 U.S.C. 154(b) by 69 days.

(21) Appl. No.: 10/762,557

(22) Filed: Jan. 23, 2004

(65) Prior Publication Data

US 2004/0211720 A1  Oct. 28, 2004

(30) Foreign Application Priority Data

Jan. 24, 2003 (DE) ................. 103 02 935

(51) Int. Cl.
*F02M 37/20* (2006.01)
*F02M 37/22* (2006.01)
*B01D 35/01* (2006.01)

(52) U.S. Cl. .................. 210/416.4; 210/436; 210/472
(58) Field of Classification Search ............... 210/188, 210/232, 416.1, 416.4, 435, 436, 450, 472, 210/493.2
See application file for complete search history.

(56) References Cited

U.S. PATENT DOCUMENTS

| 1,937,415 A | * | 11/1933 | Sidney .................. 210/349 |
| 2,942,732 A | * | 6/1960 | Edelen .................. 210/436 |
| 5,084,170 A | * | 1/1992 | Janik et al. ............ 210/232 |
| 5,108,381 A | * | 4/1992 | Kolozsi ................. 604/319 |
| 5,417,860 A | * | 5/1995 | Kay ....................... 210/472 |
| 5,879,552 A | * | 3/1999 | Bradfield .............. 210/411 |
| 6,533,932 B1 | * | 3/2003 | Kallberg et al. ...... 210/232 |

FOREIGN PATENT DOCUMENTS

| DE | 195 19 352 A1 | 11/1996 |
| DE | 195 38 883 A1 | 4/1997 |
| DE | 197 16 085 A | 10/1998 |
| EP | 1 124 056 B1 | 8/2001 |
| FR | 1 445 709 A | 10/1966 |

* cited by examiner

*Primary Examiner*—Fred G. Prince
(74) *Attorney, Agent, or Firm*—Crowell & Moring LLP

(57) ABSTRACT

A filter element (4; 4') for a fuel filter arrangement has a first end disk (15; 15') and a second end disk (16; 16') between which extends a return line (18; 35), each opening into an outlet opening (24; 24') on the outside of the filter element (4; 4'). The fuel filter housing (2) for such a filter element (4; 4') has a fuel connection (11) which opens in a guide tube (10) above a bottom area (7, 8) of the filter housing (2). A first filter sealing area (22) cooperates with a first housing sealing area (9) and a second filter sealing area (21) cooperates with a second housing sealing area (12).

5 Claims, 1 Drawing Sheet

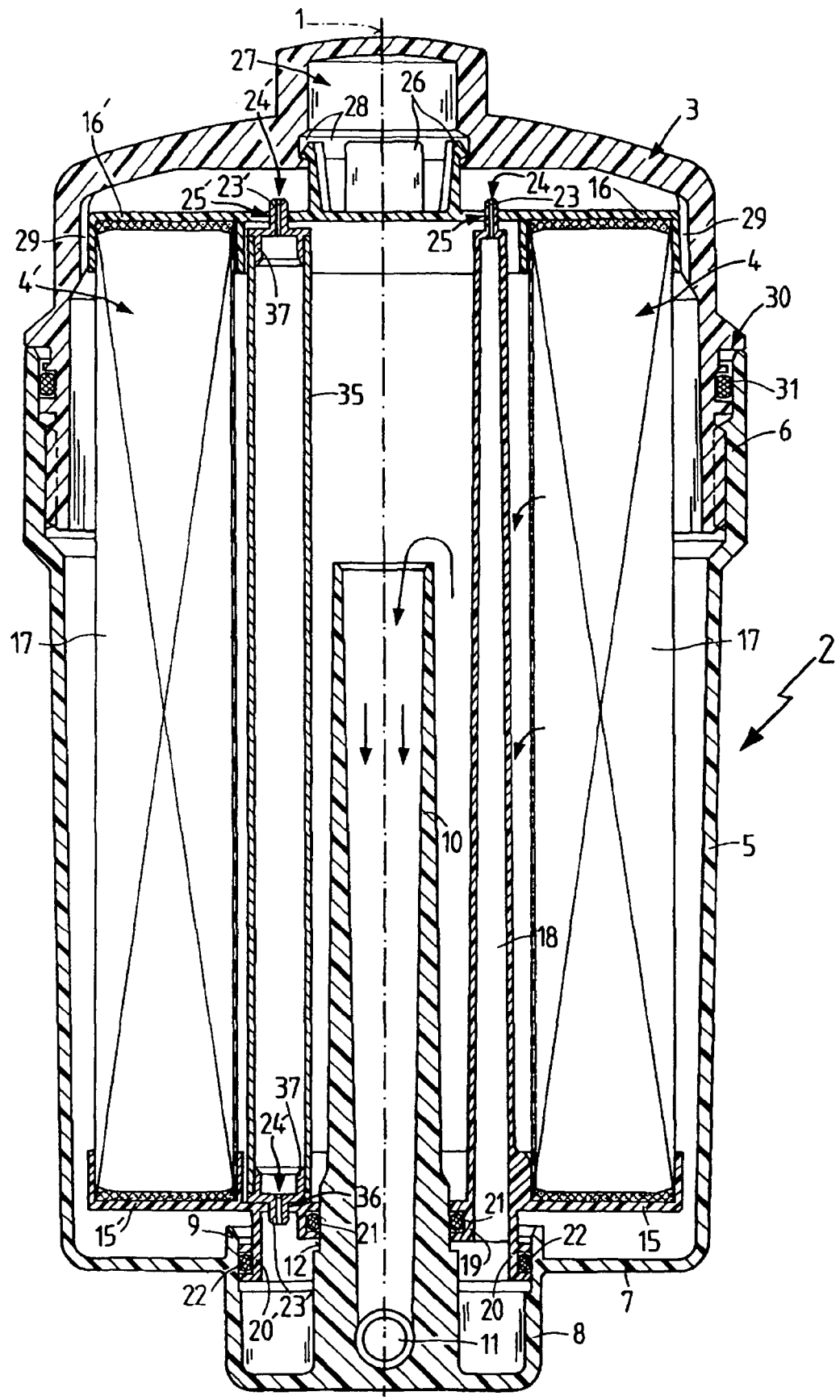

SELF-VENTING FILTER ELEMENT FOR A FUEL FILTER ARRANGEMENT

BACKGROUND OF THE INVENTION

This invention relates to a filter element for a filter arrangement, particularly a fuel filter arrangement. Such fuel filter arrangements are frequently provided in conjunction with internal combustion engines for motor vehicles. The problem that occurs here is air collecting in the filter housing of the filter element, which can lead to problems in operation of the internal combustion engine if air enters the fuel injection system of the engine.

To solve these problems, it has been proposed that boreholes be provided at suitable locations in the fuel filter housing so that air can escape to the outside. However, one problem here is that fuel-laden vapors can also escape, but this should always be avoided because of environmental regulations, which have become increasingly strict over the years.

SUMMARY OF THE INVENTION

It is an object of the present invention to provide an improved fuel filter for use with internal combustion engines, particularly for motor vehicles.

Another object of the invention it to provide a fuel filter arrangement and fuel filter element which assure reliable operation of an internal combustion engine even with fuel that contains air.

These and other objects are achieved in accordance with the present invention by providing a filter element for a fuel filter, said filter element comprising a first end disk, a second end disk, a filter medium extending between said first and second end disks, and a return line which is arranged between the first and second end disks and which opens into an outlet opening on the outside of the filter element.

Accordingly, the present invention provides a filter element, which has a first end disk and a second end disk. Between the two end disks, there extends a filter medium which divides the filter element into an inside and an outside. In addition, there is a return line extending between the first end disk and the second end disk, opening into an outlet opening on the outside of the filter element.

With the inventive filter element, venting of the filter installation area through a vent channel integrated into the filter element is accomplished to advantage. In filter operation, the air is directed through the vent channel into the upper area of the filter element and from there through a return channel back to the fuel tank of the motor vehicle. This yields the advantage that the air trapped in the fuel is not discharged to the external environment nor is it conveyed toward the injection pump or the internal combustion engine. This invention can be used with all liquid filters where venting problems must be solved. To this extent, it's usefulness is not limited to filter arrangements for internal combustion engines.

The outlet opening of the inventive return line preferably has a diameter of about 0.2 mm to 0.5 mm. This ensures that in particular air is returned through the return line, passing through such small-diameter outlet openings more easily than would diesel fuel, for example.

According to a preferred aspect of the invention, at least one of the end disks of the filter element has a first filter sealing area which is directed toward the outside of the filter element. In addition, a second filter sealing area directed toward the inside of the filter element is also provided. The outlet opening is advantageously situated between the first filter sealing area and the second filter sealing area. This ensures reliable operation of the inventive filter element. Then excess air can be removed in a particularly simple manner without interfering with the filter operation.

The inventive filter element can be manufactured easily if the return line is integrally constructed in a filter element carrier produced as an injection molded part on which the filter medium is provided. In a modification thereof, the return line may also be designed as a line section, which leads to the outlet openings in the end disks. Such a line section may be, for example, a metallic tube or a plastic tube which is constructed at the ends so that leads to the outlet openings.

The fuel filter housing according to the invention has a first fuel connection, which opens at a guide tube above a bottom area of the filter housing. In addition, a second fuel connection is provided, opening in the bottom area of the filter housing. A first housing sealing area and a second housing sealing area are provided in the area between the first fuel connection and the second fuel connection. Such a fuel filter housing is especially easy to maintain. The difference in height between the mouth area of the first fuel connection and the mouth area of the second fuel connection ensures that the fuel filter housing will not run completely empty when the combustion engine is shut down. Furthermore, especially reliable functioning is assured due to the cooperation of the first filter sealing area with the first housing sealing area and the second filter sealing area with the second housing sealing area.

A motor vehicle according to the invention has an internal combustion engine with such a fuel filter arrangement, wherein both the fuel supply connection and the fuel return connection are connected to the fuel tank of the motor vehicle.

This invention can be implemented in a particularly advantageous manner if an electrically or mechanically operated fuel pump is provided downstream from the fuel return connection in the fuel return line. With such a fuel pump, it is also possible to convey even fuel that contains air away from the inventive fuel filter housing in a particularly reliable manner.

BRIEF DESCRIPTION OF THE DRAWING

The invention will be described in further detail hereinafter with reference to two illustrative embodiments of fuel filters, both of which are depicted in the accompanying drawing FIGURE, which is a cross-sectional view through two fuel filter arrangements according to the invention.

DETAILED DESCRIPTION OF PREFERRED EMBODIMENTS

FIG. 1 shows two filter embodiments joined at an axis of symmetry 1. On the right side of FIG. 1, the first illustrative embodiment of an inventive fuel filter arrangement is shown, and the left half of FIG. 1 shows a second illustrative embodiment of an inventive fuel filter arrangement. Of course, it should be understood that in actual practice each of the two embodiments will comprise an annular arrangement, only half of which has been shown in FIG. 1 for convenience of illustration. In the two embodiments, like parts are identified by the same reference numerals.

The inventive fuel filter arrangement is comprised of a fuel filter housing 2, a housing cover 3 placed on the fuel filter housing 2, and a filter element 4 or 4' installed in the fuel filter housing 2. The filter element 4 according to the first illustrative embodiment has minor differences from the filter element 4' according to the second illustrative embodiment, as explained in greater detail below in conjunction with the interaction of the fuel filter housing 2 and the filter element 4 or the filter element 4'.

The fuel filter housing 2 is divided into a cylindrical pot area 5, which is widened at the top to form a cover receptacle 6, and a housing bottom 7 in which a collecting chamber 8 is shaped so it protrudes downward. A retaining collar 9, which projects beyond the housing bottom 7, is designed in the area between the housing bottom 7 and the collecting chamber 8. In addition, starting from the collecting chamber 8, a return opening (not visible in this view) is also provided, leading to a fuel tank (also not shown in this view) of a motor vehicle by way of a return line (not shown).

Starting from the collecting chamber 8, a guide dome 10 extends along the axis of symmetry 1 upward into the interior of the pot area 5. The guide dome 10 is designed to be hollow in the interior and tapers toward the top. A discharge line 11 is provided on the lower side of the guide dome 10 and is connected to an outlet line (not shown in this view), which leads to the combustion chamber. A sealing shoulder 12 is provided on the guide dome 10 approximately at the height of the retaining collar 9, which surrounds the guide dome 10.

The filter element 4 according to the first illustrative embodiment comprises a lower end disk 15, an upper end disk 16 and a filter medium 17 which is received annularly between the lower end disk 15 and the upper end disk 16. Both the upper end disk 16 and the lower end disk 15 are made of synthetic resin material (i.e., plastic), for example, by an injection molding method.

The lower end disk 15 is designed with an upwardly extending return line or channel 18. In the transitional area between the return line 18 and the lower end disk 15, an inner sealing ring receptacle 19 is provided. A peripheral outer sealing ring receptacle 20 is also provided adjacent collar 9. An inner sealing ring 21 is provided in the inner sealing ring receptacle 19 and an outer sealing ring 22 is provided in the outer sealing ring receptacle 20. The inner sealing ring 21 seals the lower end disk 15 with respect to the guide dome 10. The outer sealing ring 22 seals the lower end disk 15 with respect to the retaining collar 9.

The return line 18 tapers upward to a guide tip 23 in which a nozzle opening 24 with a diameter of about 0.2 mm to 0.5 mm is provided.

The upper end disk 16 is provided with a guide opening 25 at the point where the guide tip 23 passes through. In the area of the upper end disk 16 around the axis of symmetry 1, a four-part holding clamp 26 is provided, coming in contact with the housing cover 3. The holding clamp 26 is designed here as a snap hook. In a variant embodiment not shown here, it may be constructed of multiple parts, e.g., in six parts or eight parts.

There are also other options for snapping the cover and filter element together.

The housing cover 3 includes a locking chamber 27 which is adapted to receive the holding clamp 26. Locking chamber 27 is provided with a peripheral inside catch groove 28 into which the holding clamp 26 locks when the housing cover 3 is placed on the fuel filter housing 2. Adjacent the filter element 4, the housing cover 3 is provided with through-channels 29 which permit fuel and air to pass through into the upper area of the housing cover 3, namely passing by the outside of the filter element 4. In those locations of the housing cover 3 where no through-channels 29 are provided, the housing cover 3 is designed so that it rests and is guided on the outer areas of the upper end disk 16. This guidance is useful especially in assembly. However, contact between the upper end disk 16 of the filter element and the housing cover 3 is not absolutely necessary.

The housing cover 3 is provided on its outside with a sealing shoulder area 30 in which a cover sealing ring 31 seals the transitional area between the housing cover 3 and the cover receptacle 6 to prevent any leakage of fuel to the outside of the fuel filter housing 2.

To assemble the filter element 4, it is possible to proceed as follows. First the lower end disk 15 is provided, with the inner sealing ring 21 and the outer sealing ring 22 being inserted into the inner sealing ring receptacle 19 and/or into the outer sealing ring receptacle 20. Then the filter medium 17 is placed on the lower end disk 15. Finally, the upper end disk 16 is placed on the filter medium 17, with the guide tip 23 being inserted into the guide opening 25.

Then the filter element 4 produced in this way is inserted into the housing cover 3. It is pressed in until the holding clamp 26 can be heard to engage in the catch groove 28. Then the housing cover 3 is placed on the filter element 4, with the sealing shoulder 30 being inserted inside the cover receptacle 6. By pressing the housing cover 3 into the cover receptacle 6, a tight seal is produced. In this case, the filter element 4 is pressed so far into the fuel filter housing 2 that the inner sealing ring 21 is in contact with the sealing shoulder 12. The lower end disk 15 is then pressed further until the outer sealing ring 22 is accommodated tightly in the interior of the retaining collar 9.

During operation, the inventive fuel filter arrangement functions as follows. Starting from the fuel tank, fuel is pumped to the inside of the filter housing 2. This causes the pot area 5 to fill up with fuel. The fuel then passes through the filter medium 17. The pressure of the flowing fuel forces the fuel/air mixture present in the interior of the fuel filter housing 2 through the through-channels 29. From there the fuel/air mixture passes through the nozzle opening 24 and enters the interior of the return line 18. From there the air is pumped through the return line 18 back into the fuel tank. It is important here that the air passes through the nozzle opening 24 more easily than does the fuel. This creates a return flow from the fuel filter housing 2 to the fuel tank, which is smaller than the fuel flow to the fuel filter arrangement.

When the conveyance of fuel through the discharge line 11 is stopped, the fuel level inside the fuel filter housing 2 drops until reaching the upper edge of the guide dome 10. This ensures that after the vehicle has been shut off, there will still be enough fuel in the interior of a fuel filter housing 2, and particularly in the guide dome 10, to ensure a flow of fuel upon restarting until sufficient fuel is resupplied to the filter to keep the motor going.

Instead of having the return line 18 integrally molded into it, the second illustrative embodiment of this invention has a filter element 4' with a return line tube 35 made of sheet steel inserted between a lower end disk 15' and an upper end disk 16'. The return line tube 35 is extended through a guide opening 25' in the upper end disk 16' and through a guide opening 36 in the lower end disk 15'. To do so, the return line tube 35 is provided with a guide cap 37 on its top side and another on its lower side, each having a guide tip 23' and a nozzle opening 24'.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for a fuel filter system, comprising:
a first end disk having a guide opening;
a second end disk having a guide opening;
a filter medium between the first end disk and the second end disk;
a return line having first and second ends, wherein the return line has a guide cap at each of its first and second ends, which guide cap has a guide tip and a nozzle orifice that opens to the outside of the filter element, wherein the return line extends between the first end disk and the second end disk, and wherein the return line is carried with one of its guide tips being inserted into the guide opening of the first end disk and the other guide tip being inserted into the guide opening of the second end disk.

2. A filter element according to claim 1, wherein at least one nozzle orifice has a diameter of about 0.2 mm to 0.5 mm.

3. A filter element according to claim 2, wherein one of the first and second end disks has a first filter sealing area, which is directed exteriorly of the filter element, and a second filter sealing area, which is directed interiorly of the filter element, and wherein one of the nozzle orifices is situated between the first filter sealing area and the second filter sealing area.

4. In an internal combustion engine, the improvement comprising a fuel filter according to claim 1.

5. In a motor vehicle having an internal combustion engine, the improvement comprising a fuel filter according to claim 1, wherein a liquid connection of a filter housing of the fuel filter is connected to a fuel line of a fuel tank, and another liquid connection of the filter housing is connected to a fuel return line leading to the fuel tank.

* * * * *